C. B. KURTZ.
POWER TRANSMISSION MECHANISM.
APPLICATION FILED MAY 4, 1916.
1,223,400.
Patented Apr. 24, 1917.
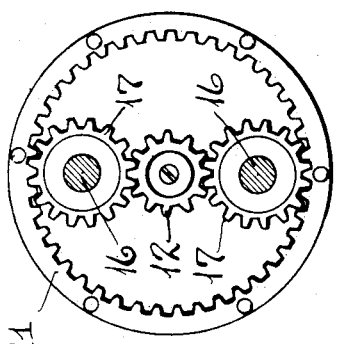
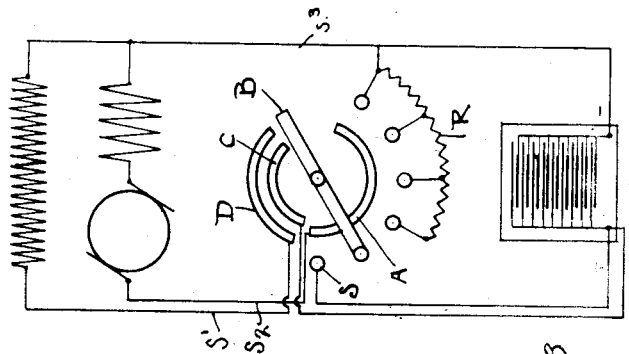
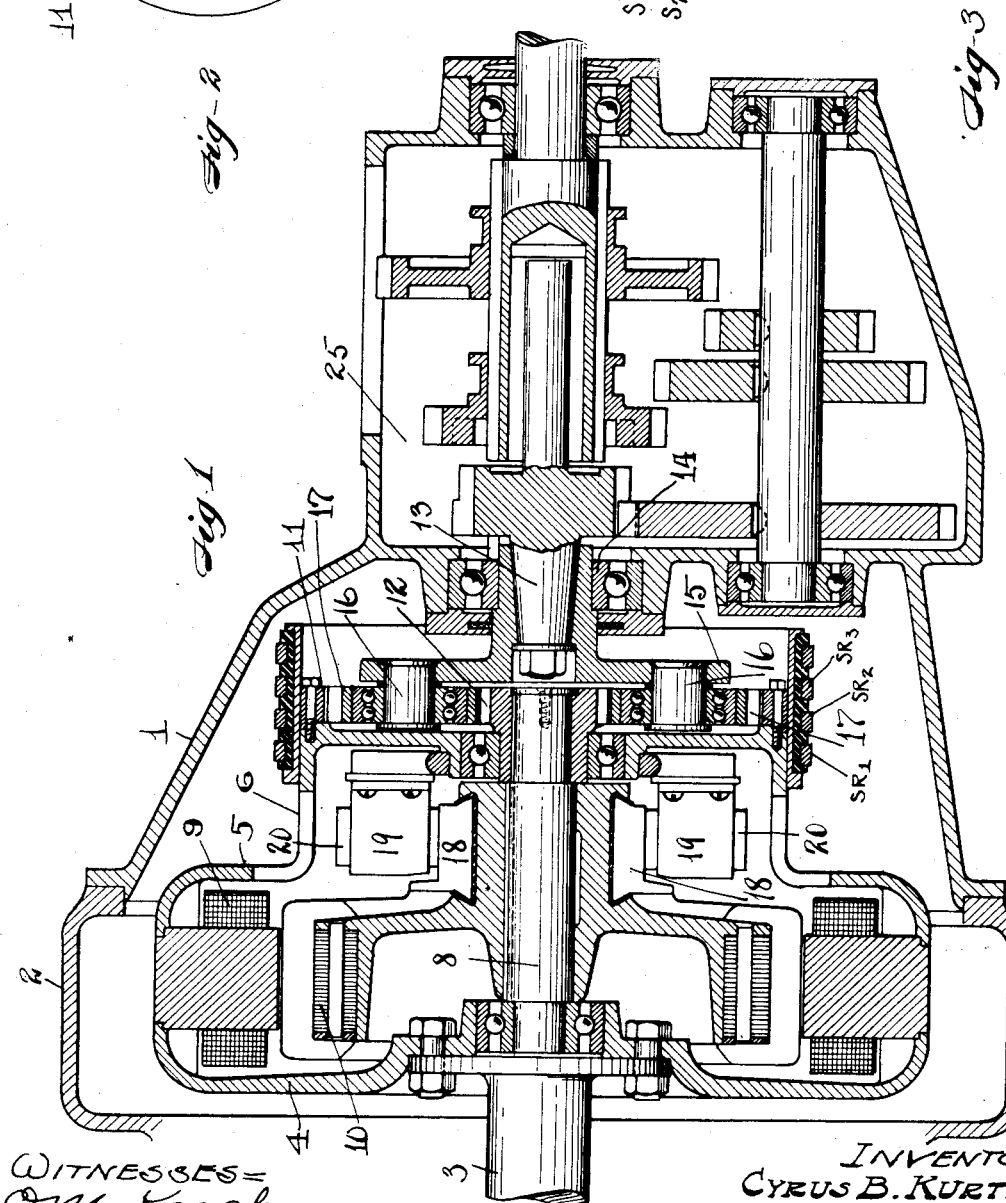
WITNESSES:
O. M. Kappler
Thos. H. Fay
INVENTOR
Cyrus B. Kurtz.
BY Fay, Oberlin & Fay, ATTYS.

UNITED STATES PATENT OFFICE.

CYRUS B. KURTZ, OF LAKEWOOD, OHIO.

POWER-TRANSMISSION MECHANISM.

1,223,400.

Specification of Letters Patent.  Patented Apr. 24, 1917.

Application filed May 4, 1916. Serial No. 95,341.

*To all whom it may concern:*

Be it known that I, CYRUS B. KURTZ, a citizen of the United States, and a resident of Lakewood, county of Cuyahoga, and State of Ohio, have invented a new and useful Improvement in Power-Transmission Mechanism, of which the following is a specification, the principle of the invention being herein explained and the best mode in which I have contemplated applying that principle, so as to distinguish it from other inventions.

The present invention relates to power transmission mechanism particularly suitable for use in vehicles or in the transmission of power where there is a continual variation of the load or in the speeds of the driving and driven members. To gain this end, I have made use of a dynamo to give a clutch action and have combined the same with differential gearing, so that the greater part of the torque is transmitted through the gearing, thus reducing the size of the dynamo required. By combining these elements in the fly wheel of the engine, a very convenient starting motor is also obtained. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1, is a section through my improved transmission mechanism showing the parts in their operative relation; Fig. 2, is a diagrammatic sketch of the gearing; and Fig. 3, is a wiring diagram.

The invention consists, briefly stated, in coöperative dynamo electric members, suitably connected by differential mechanism operating against a reaction member, the latter being connected to the driven shaft and being held from rotating when the mechanism is used to start the engine. In my present device, I show a housing 1 which will be attached to a crank case 2 of an automobile engine and will extend rearwardly to carry the clutch, dynamo, and the transmission case, thus forming the usual transmission unit. To the crank shaft 3 of the engine (not shown) I preferably bolt a fly wheel member which has an extending portion 5 with hand hole openings 6. This fly wheel member has ball bearings attached thereto which carry a floating shaft 8. In this fly wheel member I preferably mount a dynamo electric member in the form of a field coil 9, and to the rear end of the fly wheel an internal gear 11 is attached. A second and coöperative dynamo electric member in the form of an armature 10 is mounted on the floating shaft 8 so as to be freely rotatable, and this armature has at its rear end a small spur gear 12 which is alined with the internal gear on the fly wheel member. It will be seen that the armature is completely inclosed by the fly wheel member but the usual hand holes allow the armature, commutator and brushes to be inspected.

The driven shaft 13 which is carried in a bearing 14 in the transmission case 25 which is of the usual three speed selective type, has mounted at the forward end, an annular flange 15 in which are mounted a series of short stub shafts 16 carrying spur gears 17. These small spur gears are meshed with the internal gear on the fly wheel housing and also with the spur gear carried by the armature of the dynamo. The flange bearing the stub shafts 16 serves as a reaction member during the starting action, when it is held from rotation in the manner presently to be explained.

The armature has a commutator 18 mounted thereon which is insulated from the armature proper, and brush holders 19 are carried upon the fly wheel housing, but insulated therefrom so as to allow the brushes 20 to make an electrical contact with the commutator. Upon the fly wheel member 4, there are mounted slip rings $SR_1$, $SR_2$, $SR_3$, which are contacted by the usual brushes (not shown). These rings, three in number, will be electrically connected to the field, the armature and to the return wire or ground. The fourth ring would be used only when the dynamo is used to charge the battery. By referring to the wiring diagram, the connections will be readily apparent.

The switch as shown in the diagram, is in the open position indicating that the engine is not running. When the dynamo is to be used as a starting motor the switch will be closed through the contact S. In this position, the circuit will be made from the battery, through the switch arm, and the contact S to the contact segment A, the armature and the series field of the dynamo and thence back to the battery through the return wire $S_3$. This closes the dynamo circuit and causes the dynamo to operate as a motor. To accomplish the cranking operation, it is necessary to hold the annular flange from rotating, in which case the armature revolving will cause the field and the fly wheel of the engine to revolve, in the opposite direction, the speeds being dependent upon the value of the gear train.

When using the engine to drive the car, the switch will be moved counter-clockwise, which will first close the exciting circuit through the end B of the switch arm contact segments C and D, connection $S_1$, and back through the return or ground wire $S_3$. This builds up the field and then further movement of the switch makes a closed circuit through the armature and series field, contact segment A and the resistance R. By further movement of the switch arm the resistance R can slowly be taken out of this circuit.

Having started the engine, to rotate the driven shaft the switch member will be moved to the position above stated including the resistance R in the armature circuit. At this time the generator field will be revolving, carrying the internal gear therewith, which in turn will rotate the gears carried on the stub shafts and thus rotating the small spur gear connected to the armature. Then if the car is in gear, the difference in speed between the armature and field will create a current through the closed armature circuit and there will be a drag which will reduce the relative speed of the two electric elements. As this takes place the stub shafts will revolve carrying the annular flange and thus rotating the driven member.

As a current is generated in the armature, it tends to revolve with the field and this reduces the revolution of the gears until the driven shaft is revolving at substantially the same speed as the field, at which point the gear train would be locked and would revolve as a whole with the internal gear as will be readily understood. While this point will never be reached the slip or the difference in speed between the field and armature will be small, and will be only enough to generate sufficient current to cause the necessary drag to make the device act as a clutch.

In the present device, the value of the gear train is three to one which means that the armature will revolve three times as fast as the field but in the opposite direction which means an actual 4 to 1 reduction. As the stub shafts transmit the torque at no time can there be more than ¼ the torque transmitted through the electrical unit, that is the armature and the small spur gear. In this way it has been found possible to use an electrical unit of only one fourth the size required, were all the torque transmitted through the electrical clutch action, and yet all the advantages of electrical transmission are retained. There is no jar or grabbing as in the usual forms of mechanical clutch and if more torque is needed, the slip between the armature and field automatically increases until the current increase is sufficient. It will be seen that the present device is really an electric starter and a clutch and yet the torque is to a large extent transmitted through the gears. A great saving in weight is obtained along with the advantages of the smooth electrical clutch action, and use can be made of a very small high speed electrical unit. In this connection, it will be readily apparent that a gear train of any desired value may be used depending on the torque to be transmitted and a gear train having a value of 4 to 1, or one of 5 or 6 to 1 can be substituted. As the final drive is substantially a direct drive, the gear train can be made of any value found most suitable.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a main driving member and a driven member, of two cooperative dynamo electric elements, one of said electric elements being connected to said driving member, and differential mechanism connecting said two dynamo elements with said driven member.

2. The combination with a main driving member and a driven member, of two cooperative dynamo electric elements, one of said electric elements being connected to said driving members, the other of said electric elements being freely rotatable and planetary gearing connecting said two dynamo electric elements with said driven member.

3. The combination with a main driving member and a driven member of two cooperative dynamo electric elements, one of said electric elements being connected to said driving member, the other of said electric elements being freely rotatable; said two electric elements being adapted to act as a clutch, and planetary gearing connecting said two elements with said driven member, the slip between said two dynamo electric elements determining the speed ratio between the driving members.

4. The combination with a main driving member and a driven member, of a dynamo field element carried by said driving member; a freely rotatable coöperative dynamo armature element, and differential mechanism operatively connecting said two electric elements with said driven member.

5. The combination with a main driving member and a driven member, of a dynamo field member carried by said driving member; a freely rotatable coöperative dynamo armature element and planetary gearing operatively connecting said two electric elements with said driven member, said mechanism consisting of an internal gear connected to said dynamo field element, gears carried by said driven member and in mesh with said internal gear, and a gear carried by said armature element and meshing with said gears carried by said driven member.

6. The combination with a main driving member and a driven member, of a dynamo field element carried by said driving member; a freely rotatable coöperating dynamo armature element and planetary gearing operatively connecting said two electric elements with said driven member, said gearing consisting of an internal gear connected to said dynamo field element, a flange on said driven member, stub shafts mounted in said flange and carrying gears meshing with said internal gear and a gear carried by said armature element and meshing with said gears on said stub shafts, said planetary gearing being adapted to drive said driven member from said driving member at variable speeds, the speed ratio of the driving and driven members depending on the slip between said dynamo field element and said dynamo armature.

Signed by me, this 21st day of April 1916.

CYRUS B. KURTZ.

Attested by—
H. B. FAY,
THOMAS H. FAY.